United States Patent
Jiang

(10) Patent No.: US 11,443,019 B2
(45) Date of Patent: Sep. 13, 2022

(54) METHODS AND DEVICES FOR FINGERPRINT UNLOCKING

(71) Applicant: BEIJING XIAOMI MOBILE SOFTWARE CO., LTD., Beijing (CN)

(72) Inventor: Zhongsheng Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 728 days.

(21) Appl. No.: 16/263,563

(22) Filed: Jan. 31, 2019

(65) Prior Publication Data

US 2019/0251329 A1     Aug. 15, 2019

(30) Foreign Application Priority Data

Feb. 13, 2018   (CN) .......................... 201810150417.4

(51) Int. Cl.
*G06F 21/32* (2013.01)
*G06F 1/3234* (2019.01)
(Continued)

(52) U.S. Cl.
CPC ............ *G06F 21/32* (2013.01); *G06F 1/3231* (2013.01); *G06F 1/3262* (2013.01); *G06F 3/041* (2013.01);
(Continued)

(58) Field of Classification Search
CPC .. G06K 9/00087; G06K 9/0008; G06K 9/001; G06F 1/3262; G06F 3/04144;
(Continued)

(56) References Cited

U.S. PATENT DOCUMENTS

2014/0198960 A1   7/2014  Thompson
2015/0177884 A1*  6/2015  Han .................... G06F 3/04166
                                                                345/174
(Continued)

FOREIGN PATENT DOCUMENTS

CN          105740690 A      7/2016
CN          106815546 A      6/2017
(Continued)

OTHER PUBLICATIONS

First Office Action issued to European Application No. 19156928.4 dated Jan. 14, 2021, (5p).
(Continued)

*Primary Examiner* — Premal R Patel
(74) *Attorney, Agent, or Firm* — Arch & Lake LLP

(57) ABSTRACT

A method of unlocking an electronic device with fingerprints is provided. The method includes: detecting a first contact parameter between an object and a touch screen of the electronic device; in response to determining that the first contact parameter meets a first preset condition to awaken a fingerprint recognition function of the electronic device, detecting a second contact parameter between the object and the touch screen; and awakening the fingerprint recognition function; in response to determining that the second contact parameter meets a second preset condition to perform the fingerprint recognition function, collecting fingerprint information of the object with a fingerprint sensor configured in the touch screen; and in response to determining that the fingerprint information matches pre-stored reference fingerprint information, unlocking the electronic device.

20 Claims, 6 Drawing Sheets

S201: in response to determining that a first contact parameter between an object and a touch screen meets a first preset condition to awaken a fingerprint recognition function of the electronic device, detect a second contact parameter between the object and the touch screen and awaken the fingerprint recognition function S202: in response to determining that the second contact parameter meets a second preset condition to perform the fingerprint recognition function, collect fingerprint information of the object with a fingerprint sensor configured in the touch screen S203: in response to determining that the fingerprint information matches pre-stored reference fingerprint information, unlock the electronic device

(51) Int. Cl.
*G06F 3/041* (2006.01)
*G06F 1/3231* (2019.01)
*G06V 40/12* (2022.01)

(52) U.S. Cl.
CPC ...... *G06F 3/04144* (2019.05); *G06V 40/1365* (2022.01)

(58) Field of Classification Search
CPC ........ G06F 1/3231; G06F 3/041; G06F 21/32; G06F 21/81; G06V 40/1365; G06V 40/1359; G06V 40/1376
See application file for complete search history.

(56) References Cited

U.S. PATENT DOCUMENTS

| | | | | |
|---|---|---|---|---|
| 2016/0171281 A1* | 6/2016 | Park | ................. | G06F 3/03547 382/124 |
| 2016/0283772 A1* | 9/2016 | Nelson | ............... | G06K 9/00033 |
| 2017/0220842 A1 | 8/2017 | Thompson | | |
| 2017/0300736 A1* | 10/2017 | Song | ................. | G06K 9/0004 |
| 2017/0316250 A1* | 11/2017 | Roh | ................. | G06F 3/0488 |
| 2018/0113512 A1* | 4/2018 | Kang | ................. | G06F 1/1643 |
| 2018/0300529 A1* | 10/2018 | Zuo | ................. | G06F 1/3293 |
| 2018/0314874 A1* | 11/2018 | Yang | ................. | G06F 3/0484 |
| 2018/0369866 A1* | 12/2018 | Sammoura | ............ | G06K 9/0002 |
| 2019/0130157 A1* | 5/2019 | Oh | ................. | G06F 1/3265 |
| 2019/0204868 A1* | 7/2019 | Choi | ................. | H04M 1/725 |
| 2019/0391432 A1* | 12/2019 | Lee | ................. | G06F 1/1684 |
| 2019/0392422 A1* | 12/2019 | Yim | ................. | G06Q 20/409 |
| 2020/0026900 A1* | 1/2020 | Zhou | ................. | G06K 9/2027 |
| 2020/0092411 A1* | 3/2020 | Xu | ................. | G06K 9/00087 |
| 2020/0175143 A1* | 6/2020 | Lee | ................. | H04M 1/0266 |
| 2021/0124814 A1* | 4/2021 | Andersson | ............ | G06F 3/0416 |

FOREIGN PATENT DOCUMENTS

| | | |
|---|---|---|
| CN | 106909405 A | 6/2017 |
| CN | 107015703 A | 8/2017 |
| CN | 107103223 A | 8/2017 |
| EP | 3211514 A1 | 8/2017 |
| EP | 3252644 A1 | 12/2017 |

OTHER PUBLICATIONS

European Patent Office, Extended European Search Report Issued in Application No. 19156928.4, dated Jul. 3, 2019, Germany, 6 pages.
State Intellectual Property Office of the People's Republic of China, Office Action and Search Report Issued in Application No. 201810150417.4, dated Mar. 22, 2019, 17 pages, (Submitted with Machine Translation).

* cited by examiner

METHODS AND DEVICES FOR FINGERPRINT UNLOCKING

CROSS REFERENCE TO RELATED APPLICATION

This application is based on and claims priority to Chinese Patent Application No. 201810150417.4, filed on Feb. 13, 2018, which is incorporated herein by reference in its entirety for all purposes.

TECHNICAL FIELD

The present disclosure relates to unlocking an electronic device with fingerprints.

BACKGROUND

With the development of network technology, the security of electronic devices, such as terminals, is also increasing. For example, in order to better protect user privacy, the terminal provides a password protection function, and unlocks the terminal when it detects that a password entered by the user matches an unlock password.

In some examples, the password protection function provided by the terminal may support biometric-based passwords such as fingerprint password, face password, and the like. Taking that the password protection function provided by the terminal supports the fingerprint password as an example, the terminal scans fingerprint information of a user through a fingerprint sensor, and determines whether the scanned fingerprint information matches pre-stored fingerprint information. If the scanned fingerprint information matches the pre-stored fingerprint information, the terminal is unlocked. If the scanned fingerprint information does not match the pre-stored fingerprint information, the terminal prompts the user that the entered password is incorrect.

SUMMARY

The present disclosure provides a method and an apparatus for unlocking an electronic device with fingerprints, an electronic device and a machine readable storage medium.

According to a first aspect, a method of unlocking an electronic device with fingerprints is provided, which may include: detecting a first contact parameter between an object and a touch screen of the electronic device; in response to determining that the first contact parameter meets a first preset condition to awaken a fingerprint recognition function of the electronic device, detecting a second contact parameter between the object and the touch screen; and awakening the fingerprint recognition function; in response to determining that the second contact parameter meets a second preset condition to perform the fingerprint recognition function, collecting fingerprint information of the object with a fingerprint sensor configured in the touch screen; and in response to determining that the fingerprint information matches pre-stored reference fingerprint information, unlocking the electronic device.

According to a second aspect, an electronic device is provided. The electronic device may include a processor; and a storage medium storing machine executable instructions; wherein, upon loading of the machine executable instructions, the processor is caused to execute: detecting a first contact parameter between an object and a touch screen of the electronic device; in response to determining that the first contact parameter meets a first preset condition to awaken a fingerprint recognition function of the electronic device, detecting a second contact parameter between the object and the touch screen; and awakening the fingerprint recognition function; in response to determining that the second contact parameter meets a second preset condition to perform the fingerprint recognition function, collecting fingerprint information of the object with a fingerprint sensor configured in the touch screen; and in response to determining that the fingerprint information matches pre-stored reference fingerprint information, unlocking the electronic device.

According to a third aspect, a non-transitory machine readable medium is provided. The non-transitory machine readable medium may store machine executable instructions that cause a processor to execute the operations of: detecting a first contact parameter between an object and a touch screen of an electronic device; in response to determining that the first contact parameter meets a first preset condition to awaken a fingerprint recognition function of the electronic device, detecting a second contact parameter between the object and the touch screen; and awakening the fingerprint recognition function; in response to determining that the second contact parameter meets a second preset condition to perform the fingerprint recognition function, collecting fingerprint information of the object with a fingerprint sensor configured in the touch screen; and in response to determining that the fingerprint information matches pre-stored reference fingerprint information, unlocking the electronic device.

It shall be appreciated that the above general descriptions and the following detailed descriptions are merely illustrative and explanatory and not intended to limit the present disclosure.

BRIEF DESCRIPTION OF DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
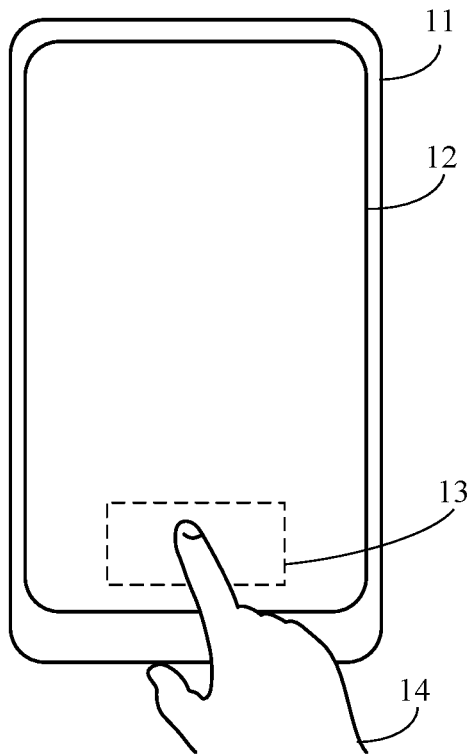
FIG. 1 is an application scenario diagram of a method of unlocking an electronic device with fingerprints according to an example.

Reference is made in detail to exemplary aspects, examples of which are illustrated in the accompanying drawings. The following description refers to the accompanying drawings in which the same numerals in different drawings represent the same or similar elements unless otherwise indicated. The implementations set forth in the following description of exemplary aspects do not represent all implementations consistent with the present disclosure. Instead, they are merely examples of apparatuses and methods consistent with aspects related to the present disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In an example of the fingerprint recognition technology, it is detected whether a finger-like object (including a finger and an object similar to the finger) contacts the touch screen. When it is detected that a contact position of the finger-like object with the touch screen is located in a fingerprint sensing region of the electronic device, the operating system of the electronic device is awakened, for example, the screen of the electronic device is lit up. After the operating system of the electronic device is awakened, a pressure sensor is started to detect a pressure value. When it is determined that the pressure value detected by the pressure sensor meets a preset condition, a fingerprint sensor is started to collect fingerprint information. The electronic device determines whether the fingerprint information matches pre-stored reference fingerprint information to obtain a result. It is determined whether the electronic device is unlocked based on the result. During the process of unlocking the electronic device, the operations performed by the electronic device are serial or sequential, which may cause the unlocking time to be relatively long.

A method of unlocking an electronic device with fingerprints is provided by examples of the present disclosure, so as to shorten the time for unlocking the electronic device with fingerprints.

FIG. 1 is an application scenario diagram of a method of unlocking an electronic device with fingerprints according to an example. The method of unlocking an electronic device with fingerprints provided by examples of the present disclosure may be applied to the electronic device 11. The electronic device 11 refers to a device with the fingerprints recognition function, such as a smart phone, a tablet computer, a PDA (Personal Digital Assistant), an e-reader, a multimedia player, and so on. The electronic device 11 is provided with a touch screen 12 and a fingerprint sensor (not shown), which is configured to detect contact parameters between the object and the touch screen 12 (such as, a pressure value applied by the object on the touch screen 12 and a contact position of the object with the touch screen 12). A fingerprint sensor is configured in the touch screen 12 and thus a fingerprint sensing region 13 is formed at a corresponding position of the touch screen 12. The fingerprint sensor may include a capacitive fingerprint sensor, an optical fingerprint sensor, an ultrasonic fingerprint sensor, or the like. When a finger 14 contacts the fingerprint sensing region 13, the fingerprint sensor may collect fingerprint information of the finger 14 to unlock the electronic device.

Figure 2:
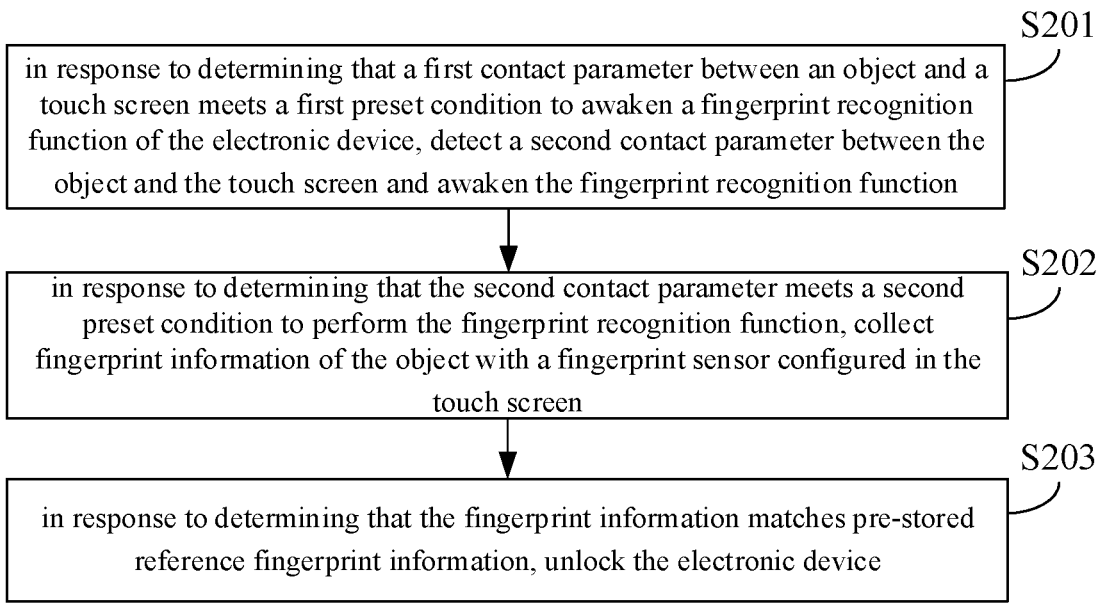
FIG. 2 is a flowchart of a method of unlocking an electronic device with fingerprints according to an example.

FIG. 2 is a flowchart of a method of unlocking an electronic device with fingerprints according to an example. As shown in FIG. 2, the method of unlocking an electronic device with fingerprints includes the following steps S201 to S203.

In step S201, in response to determining that a first contact parameter between an object and a touch screen meets a first preset condition to awaken a fingerprint recognition function of the electronic device, a second contact parameter between the object and the touch screen is detected and the fingerprint recognition function is awakened.

In step S202, in response to determining that the second contact parameter meets a second preset condition to perform the fingerprint recognition function, fingerprint information of the object is collected with a fingerprint sensor configured in the touch screen.

In step S203, in response to determining that the fingerprint information matches pre-stored reference fingerprint information, the electronic device is unlocked.

When it is detected that the first contact parameter meets the first preset condition to awaken the fingerprint recognition function, an operation of detecting the second contact parameter between the object and the touch screen and an operation of awakening the fingerprint recognition function are performed in parallel, instead of serial operations. In the serial operations, detecting the second contact parameter between the object and the touch screen is first performed and then when the second contact parameter meets the second preset condition, the fingerprint recognition function is awakened. By adopting the parallel operations, the time for unlocking the electronic device with fingerprints can be shortened.

In an example, the first contact parameter includes at least one pressure value applied by the object on the touch screen, and the first preset condition includes that a maximum pressure value of the at least one pressure value is greater than a preset threshold. The second contact parameter includes a contact position of the object with the touch screen, and the second preset condition includes that the contact position is located in the fingerprint sensing region. In the example, when it is detected that the maximum pressure value of the at least one pressure value applied by the object on the touch screen is greater than the preset threshold, an operation of "detecting the contact position of the object with the touch screen" and an operation of "awakening the fingerprint recognition function" are performed in parallel or simultaneously. In this way, the fingerprint recognition function of the electronic device is awakened while it is determined whether the contact position of the object with the touch screen is located in the fingerprint sensing region, thereby saving the time for unlocking the electronic device with fingerprints. After the fingerprint recognition function is awakened, the fingerprint sensor is initialized, so that when it is detected that the contact position of the object with the touch screen is located in the fingerprint sensing region, the initialized fingerprint sensor may immediately perform the operation of collecting the fingerprint information of the object, thereby shortening the time for unlocking the electronic device with fingerprints. Then, when it is detected that the contact position of the object with the touch screen is located in the fingerprint sensing region, the fingerprint information of the object is collected by the initialized fingerprint sensor, and it is determined whether the fingerprint information matches the pre-stored reference fingerprint information. When the fingerprint information matches the pre-stored reference fingerprint information, the electronic device is unlocked.

In another example, the first contact parameter includes a contact position of the object with the touch screen, and the first preset condition includes that the contact position is located in the fingerprint sensing region. The second contact parameter includes at least one pressure value applied by the object on the touch screen, and the second preset condition includes that a maximum pressure value of the at least one pressure value is greater than a preset threshold. In the example, when it is detected that the contact position of the object with the touch screen is located in the fingerprint sensing region, an operation of "detecting at least one pressure value applied by the object on the touch screen" and an operation of "awakening the fingerprint recognition function of the electronic device" are performed in parallel or simultaneously. In this way, the fingerprint recognition function of the electronic device is awakened while it is determined whether the maximum pressure value of the at least one pressure value is greater than the preset threshold, thereby saving the time for unlocking the electronic device with fingerprints. After the fingerprint recognition function is awakened, the fingerprint sensor is initialized, so that when it is determined that the maximum pressure value of the at least one pressure value is greater than the preset threshold, the initialized fingerprint sensor may immediately perform the operation of collecting the fingerprint information of the object, thereby shortening the time for unlocking the electronic device with fingerprints. Then, when it is detected that the maximum pressure value of the at least one pressure value is greater than the preset threshold, the fingerprint information of the object is collected by the initialized fingerprint sensor, and it is determined whether the fingerprint information matches the pre-stored reference fingerprint information. When the fingerprint information matches the pre-stored reference fingerprint information, the electronic device is unlocked.

In an example, the touch screen is provided with a single touch function to detect a pressure value applied by the object on the touch screen. In the example, since one pressure value is detected each time, the detected pressure value is the maximum pressure value. In another example, the touch screen is provided with a multi-touch function to detect two or more pressure values applied by the object on the touch screen. In the example, the detected two or more pressure values may be compared to obtain a maximum pressure value.

In an example, awakening the fingerprint recognition function of the electronic device includes: first awakening an operating system of the electronic device and then awakening the fingerprint sensor through the operating system. In the example, the operating system is awakened while it is determined whether the second contact parameter meets the second preset condition to perform the fingerprint recognition function, thereby saving the time for unlocking the electronic device with fingerprints. When the second contact parameter meets the second preset condition to perform the fingerprint recognition function, the operating system and the fingerprint sensor are directly started. In another example, awakening the fingerprint recognition function of the electronic device includes sending an awakening instruction (such as a hardware interrupt signal) through the pressure sensor or the touch sensor to awaken the fingerprint sensor. The way for awakening the fingerprint recognition function has a relatively short response time and can shorten the time for unlocking the electronic device with fingerprints.

In the example, when detecting that the first contact parameter between the object and the touch screen meets the first preset condition to awaken the fingerprint recognition function, the operation of "detecting second contact parameter between the object and the touch screen" and the operation of "awakening the fingerprint recognition function" are performed in parallel, instead of serial operations. In serial operations, detecting the second contact parameter between the object and the touch screen is first performed and when the second contact parameter meets the second preset condition, the fingerprint recognition function is then awakened. By using the parallel operations, the time for unlocking the electronic device with fingerprints can be shortened.

Figure 3:
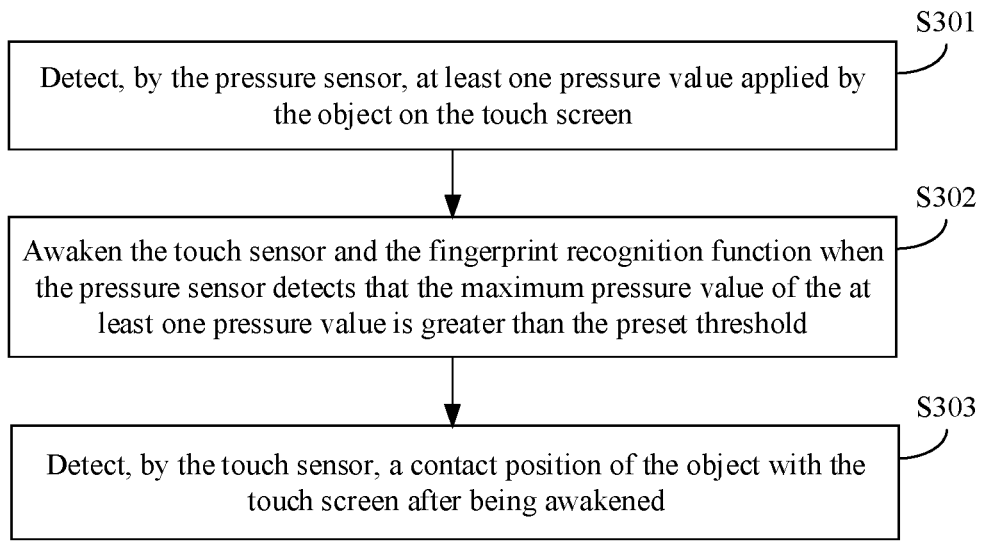
FIG. 3 is a flowchart of a method of unlocking an electronic device with fingerprints according to another example.

FIG. 3 is a flowchart of a method of unlocking an electronic device with fingerprints according to another example. The touch screen includes a touch sensor to detect a touch position or contact position of the object with the touch screen. The electronic device is further configured with a pressure sensor to detect a pressure value applied by the object on the touch screen. The first contact parameter includes at least one pressure value applied by the object on the touch screen, and the first preset condition includes that the maximum pressure value of the at least one pressure value is greater than a preset threshold; the second contact parameter includes a contact position of the object with the touch screen, and the second preset condition includes that the contact position is located in the fingerprint sensing region on the touch screen. Based on examples shown in FIG. 2, the above step S201 includes the following steps S301 to S303.

In step S301, the pressure sensor detects at least one pressure value applied by the object on the touch screen.

In an example, a pressure sensing range of the pressure sensor covers the fingerprint sensing region, instead of covering the entire touch screen, thereby saving cost. In an example, the pressure sensor is located near the fingerprint sensing region, but is not limited thereto. In another example, the pressure sensing range of the pressure sensor may also cover the entire touch screen.

In an example, the pressure sensor may be a separate sensor, which may be located above a glass cover in the touch screen module (a front side of the electronic device) or under the touch screen module. In an example, the pressure sensor may also be integrated into the touch screen module.

In an example, the touch screen is provided with a single touch function to detect a pressure value applied by the object on the touch screen. In another example, the touch screen is provided with a multi-touch function to detect two or more pressure values applied by an object on the touch screen.

In an example, before step S301, the method further includes: when detecting that the touch screen is in a screen-off state or the electronic device is in a sleeping state, a pressure sensor configured in the electronic device is controlled to enter an operating state. That is, when the electronic device is in the screen-off state or the electronic device is in the sleeping state, the pressure sensor may be started to detect the pressure value applied by the object on the touch screen in real time. For example, the pressure sensor continuously detects the pressure value applied by the object on the touch screen at a preset working frequency. To reduce power consumption, the pressure sensor may operate at relatively low operating frequencies.

In step S302, the touch sensor and the fingerprint recognition function are awakened when the pressure sensor detects that the maximum pressure value of the at least one pressure value is greater than the preset threshold.

In an example, when detecting that the maximum pressure value of the at least one pressure value applied by the object on the touch screen is greater than the preset threshold, the pressure sensor sends a first interrupt signal to the touch sensor. The first interrupt signal is used to trigger the touch sensor to work. The time for the pressure sensor to start the touch sensor through the hardware interrupt is less than the time for the operating system to start the touch sensor. In this way, the time for unlocking the electronic device with fingerprints can be further shortened.

In an example, the fingerprint recognition function is also awakened when the pressure sensor detects that the maximum pressure value of the at least one pressure value applied by the object on the touch screen is greater than the preset threshold. In an example, the pressure sensor sends a second interrupt signal to the fingerprint sensor to awaken the fingerprint recognition function. In another example, the pressure sensor sends a second interrupt signal to the operating system of the electronic device to awaken the operating system, and after being awakened, the operating system awakens the fingerprint sensor to awaken the fingerprint recognition function. The first interrupt signal and the second interrupt signal may be sent by the pressure sensor in parallel, or simultaneously.

In step S303, the touch sensor detects a contact position of the object with the touch screen after being awakened.

In an example, when the touch screen is in a screen-off state or the electronic device is in a sleeping state, the pressure sensor is first started to detect at least one pressure value applied by the object on the touch screen, and when the maximum pressure value in the at least one pressure value is greater than a preset threshold, the touch sensor and fingerprint recognition function are awakened. Since the time for directly starting the touch sensor through the pressure sensor is less than the time for "awakening the operating system through the pressure sensor and then awakening the touch sensor through the operating system", the time for unlocking the electronic device with fingerprints can be further shortened.

Figure 4:
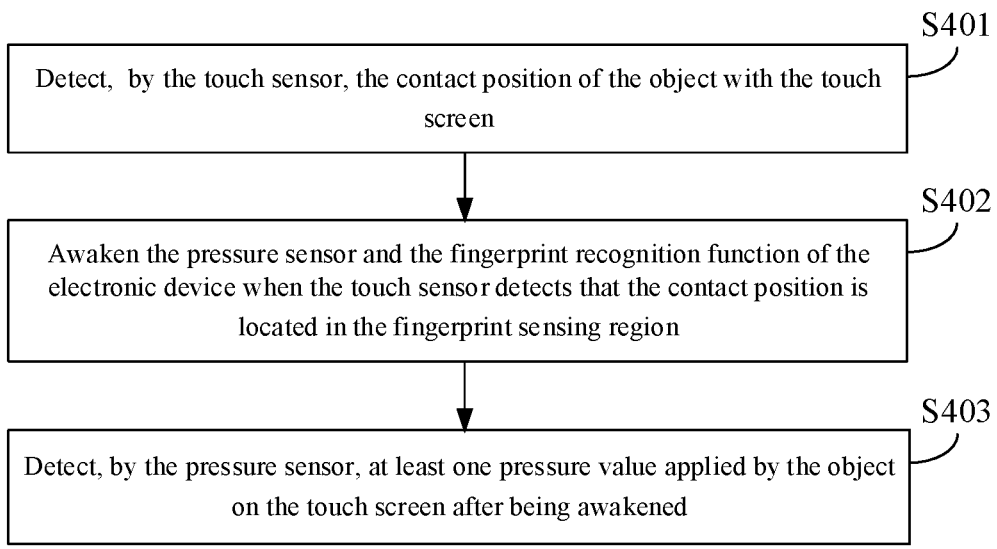
FIG. 4 is a flowchart of a method of unlocking an electronic device with fingerprints according to still another example.

FIG. 4 is a flowchart of a method of unlocking an electronic device with fingerprints according to another example. The touch screen includes a touch sensor to detect a contact position of the object with the touch screen. The electronic device is further provided with a pressure sensor to detect a pressure value applied by the object on the touch screen. The first contact parameter includes a contact position of the object with the touch screen, and the first preset condition includes that the contact position is located in the fingerprint sensing region. The second contact parameter includes at least one pressure value applied by the object on the touch screen, and the second preset condition includes that the maximum pressure value of at least one of the pressure values is greater than a preset threshold. Based on examples shown in FIG. 2, the above step S201 includes the following steps S401 to S403.

In step S401, the touch sensor detects the contact position of the object with the touch screen.

In an example, before step S401, the method may further include: when detecting that the touch screen is in a screen-off state or the electronic device is in a sleeping state, controlling the touch sensor configured in the touch screen to enter an operating state. That is, when the electronic device is in the screen-off state or the electronic device is in the sleeping state, the touch sensor is first started to detect the contact position of the object with the touch screen in real time. For example, the touch sensor continuously detects the contact position of the object with the touch screen at a preset operating frequency. To reduce power consumption, the touch sensor may operate at a relatively low operating frequency.

In step S402, the pressure sensor and the fingerprint recognition function of the electronic device are awakened when the touch sensor detects that the contact position is located in the fingerprint sensing region.

In an example, when detecting that the contact position is located in the fingerprint sensing region, the touch sensor may send a first interrupt signal to the pressure sensor, and the first interrupt signal is used to trigger the pressure sensor to work. The time for the touch sensor to start the pressure sensor through the hardware interrupt is less than the time for the operating system to start the pressure sensor. In this way, the time for unlocking the electronic device with fingerprints can be further shortened.

In an example, the fingerprint recognition function is also awakened when the touch sensor detects that the contact position is located in the fingerprint sensing region. In an example, the touch sensor sends a second interrupt signal to the fingerprint sensor to awaken the fingerprint recognition function. In another example, the touch sensor sends a second interrupt signal to the operating system of the electronic device to awaken the operating system, and after being awakened, the operating system awakens the fingerprint sensor to awaken the fingerprint recognition function. The first interrupt signal and the second interrupt signal may be sent by the touch sensor in parallel, or simultaneously.

In step S403, the pressure sensor detects at least one pressure value applied by the object on the touch screen after being awakened.

In an example, a pressure sensing range of the pressure sensor covers the fingerprint sensing region, instead of covering the entire touch screen, thereby saving cost. In an example, the pressure sensor is located near the fingerprint sensing region, but is not limited thereto. In another example, the pressure sensing range of the pressure sensor may also cover the entire touch screen.

In an example, the pressure sensor may be a separate sensor, which may be located above a glass cover in the touch screen module (a front side of the electronic device) or under the touch screen module. In an example, the pressure sensor may also be integrated into the touch screen module.

In an example, the touch screen is provided with a single touch function to detect a pressure value applied by the object on the touch screen. In another example, the touch screen is provided with a multi-touch function to detect two or more pressure values applied by an object on the touch screen.

In an example, when the touch screen is in the screen-off state or the electronic device is in the sleeping state, the touch sensor is first started to detect the contact position of the object with the touch screen, and when the contact position is located in the fingerprint sensing region, the pressure sensor and the fingerprint recognition function are awakened. Since the time for directly starting the pressure sensor through the touch sensor is less than the time for "awakening the operating system through the touch sensor and then awakening the pressure sensor through the operating system", the time for unlocking the electronic device with fingerprints can be further shortened.

Figure 5A:
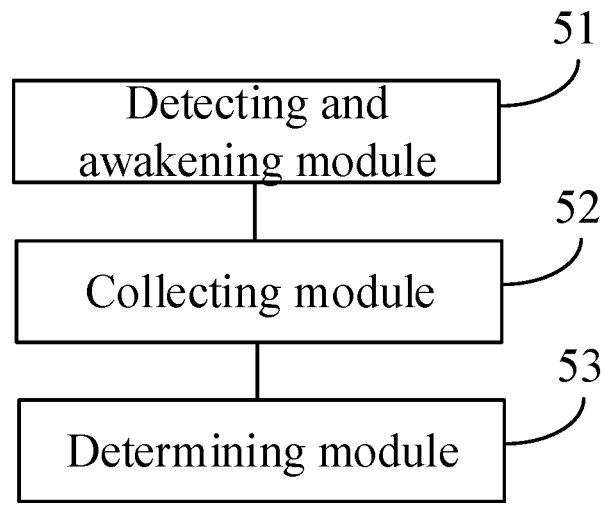
FIG. 5A is a block diagram of a fingerprint unlocking apparatus according to an example.

FIG. 5A is a block diagram of an apparatus for unlocking an electronic device with fingerprints according to an example. The apparatus is applied to the electronic device. The electronic device is provided with a touch screen and a fingerprint sensor. The electronic device is to detect contact parameters between the object and the touch screen. The fingerprint sensor is configured in the touch screen and thus a fingerprint sensing region is formed at a corresponding position of the touch screen. The apparatus includes:

a detecting and awakening module 51, configured to detect a second contact parameter between the object and the touch screen and awaken a fingerprint recognition function when it is determined that a first contact parameter between an object and a touch screen of the electronic device meets a first preset condition to awaken the fingerprint recognition function of the electronic device;

a collecting module 52, configured to collect fingerprint information of the object with a fingerprint sensor configured in the touch screen when it is determined that the second contact parameter meets a second preset condition to perform the fingerprint recognition function; and a determining module 53, configured to determine whether the fingerprint information matches pre-stored reference fingerprint information, and unlock the electronic device when it is determined that the fingerprint information matches pre-stored reference fingerprint information.

Figure 5B:
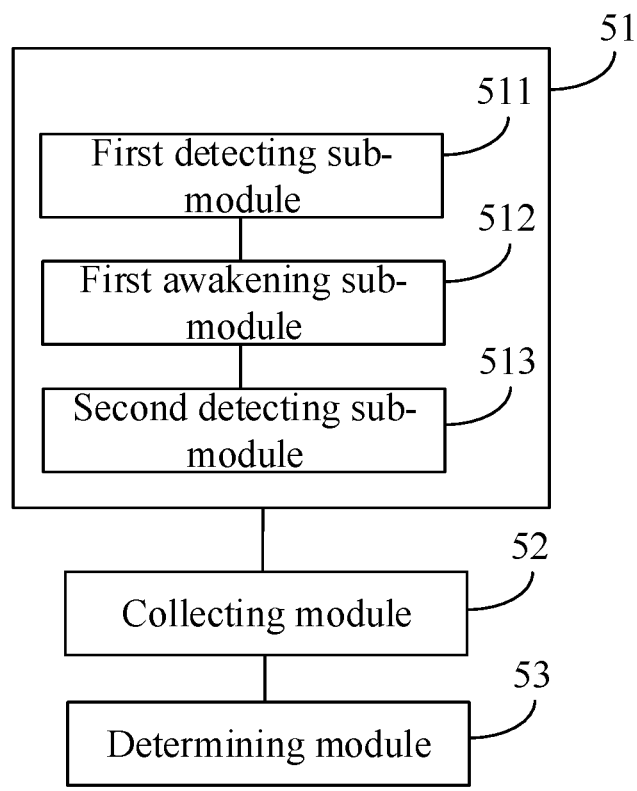
FIG. 5B is a block diagram of a fingerprint unlocking apparatus according to another example.

FIG. 5B is a block diagram of an apparatus for unlocking an electronic device with fingerprints according to an example. In the example, the touch screen includes a touch sensor. The electronic device is further provided with a pressure sensor. The first contact parameter includes at least one pressure value applied by the object on the touch screen. The first preset condition includes that a maximum pressure value of the at least one pressure value is greater than a preset threshold. The second contact parameter includes a contact position of the object with the touch screen. The second preset condition includes that the contact position is located in the fingerprint sensing region. As shown in FIG. 5B, the detecting and awakening module 51 may include:

a first detecting sub-module 511, configured to detect at least one pressure value applied by the object on the touch screen with the pressure sensor;

a first awakening sub-module 512, configured to awaken the touch sensor and the fingerprint recognition function when it is determined that a maximum pressure value of the at least one pressure value detected by the pressure sensor is greater than the preset threshold; and a second detecting sub-module 513, configured to detect a contact position of the object with the touch screen after the touch sensor is awakened.

Figure 5C:
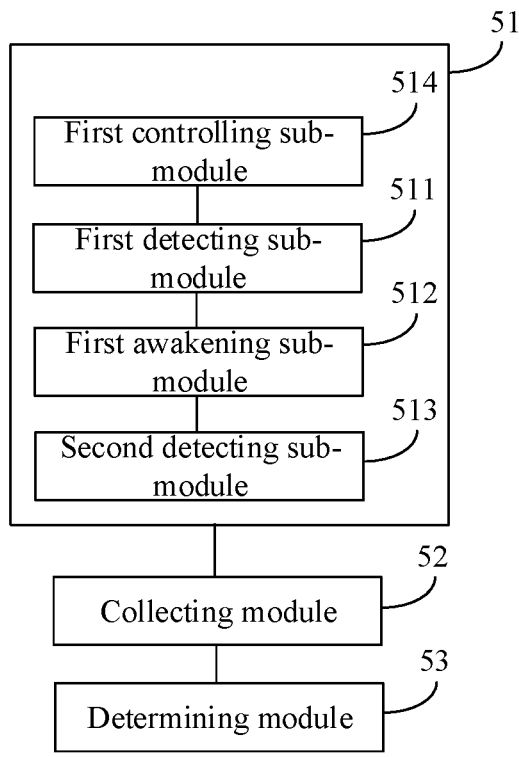
FIG. 5C is a block diagram of a fingerprint unlocking apparatus according to another example.

FIG. 5C is a block diagram of an apparatus for unlocking an electronic device with fingerprints according to an example. As shown in FIG. 5C, the detecting and awakening module 51 may further include:

a first controlling sub-module 514, configured to control the pressure sensor to enter an operating state when detecting that the touch screen is in a screen-off state or the electronic device is in a sleeping state.

Figure 5D:
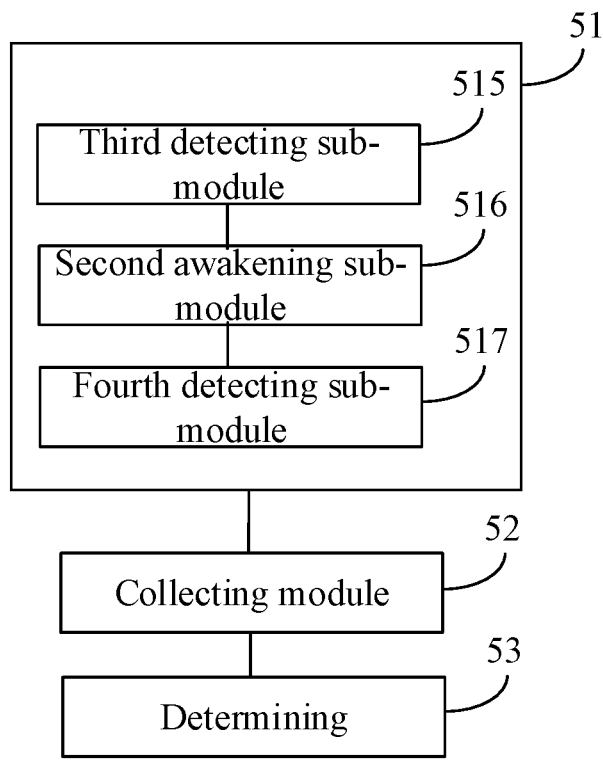
FIG. 5D is a block diagram of a fingerprint unlocking apparatus according to another example.

FIG. 5D is a block diagram of an apparatus for unlocking an electronic device with fingerprints according to an example. In the example, the touch screen includes a touch sensor. The electronic device is further provided with a pressure sensor. The first contact parameter includes a contact position of the object with the touch screen. The first preset condition includes that the contact position is located in the fingerprint sensing region. The second contact parameter includes at least one pressure value applied by the object on the touch screen. The second preset condition comprises that a maximum pressure value of the at least one pressure value is greater than a preset threshold. As shown in FIG. 5D, the detecting and awakening module 51 may include:

a third detecting sub-module 515, configured to detect a contact position of the object with the touch screen through the touch sensor;

a second awakening sub-module 516, configured to awaken the pressure sensor and the fingerprint recognition function of the electronic device when the touch sensor detects that the contact position is located in the fingerprint sensing region;

a fourth detecting sub-module 517, configured to detect at least one pressure value applied by the object on the touch screen after the pressure sensor is awakened.

Figure 5E:
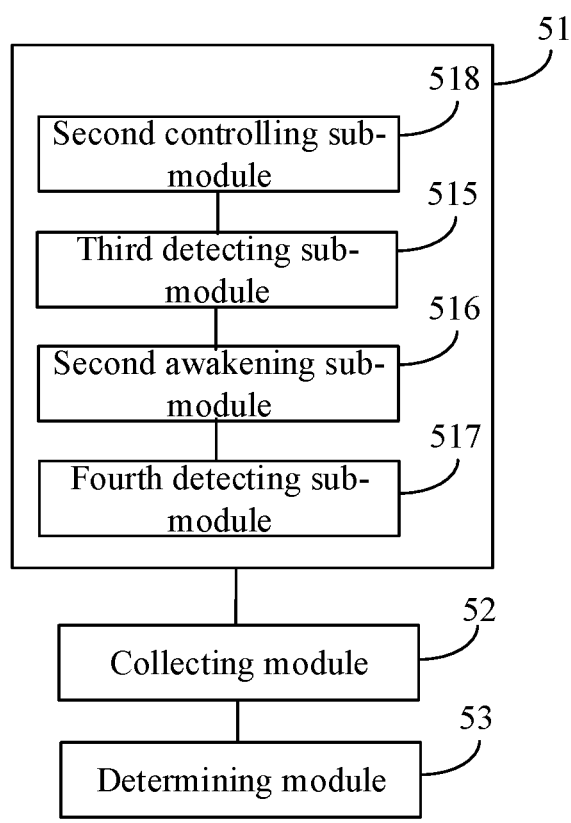
FIG. 5E is a block diagram of a fingerprint unlocking apparatus according to another example.

FIG. 5E is a block diagram of an apparatus for unlocking an electronic device with fingerprints according to an example. As shown in FIG. 5E, the detecting and awakening module 51 may further include:

a second controlling sub-module 518, configured to control the touch sensor to enter an operating state when detecting that the touch screen is in a screen-off state or the electronic device is in a sleeping state.

With regard to the apparatus in the above examples, the specific manner in which the processor performs the operations has been described in detail in the method examples, and will not be explained in detail herein.

Figure 6:
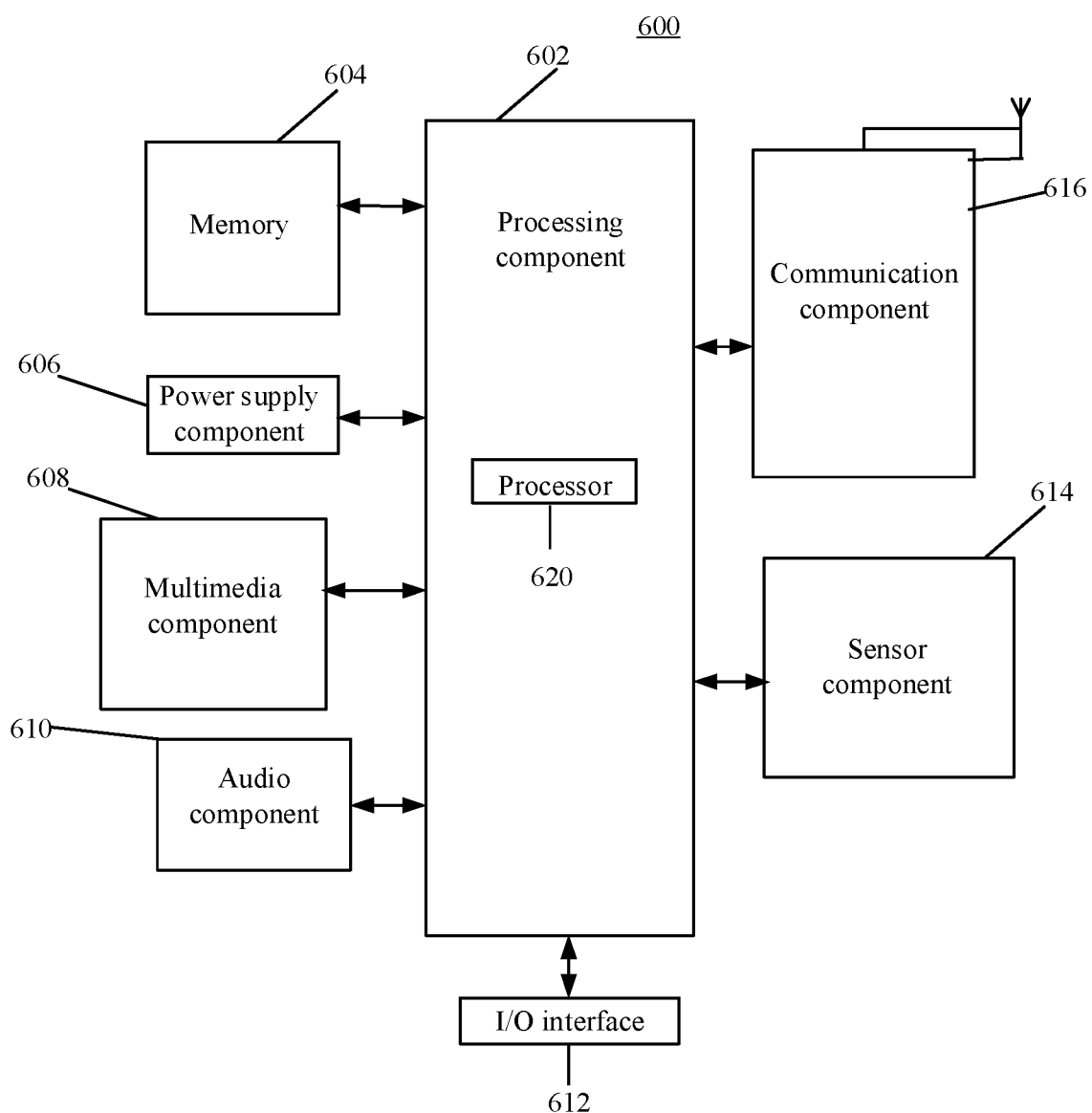
FIG. 6 is a block diagram of an electronic device according to an example.

FIG. 6 is a block diagram of an electronic device according to an example. The electronic device 600 may include a mobile phone, a computer, a digital broadcasting terminal, a message transceiver, a game console, a tablet device, a medical device, a fitness facility, or a personal digital assistant.

With reference to FIG. 6, the electronic device 600 may include one or more of: a processing component 602, a memory 604, a power supply component 606, a multimedia component 608, an audio component 610, an Input/Output (I/O) interface 612, a sensor component 614, and a communication component 616.

The processing component 602 generally controls the overall operations of the electronic device 600, such as operations associated with display, calling, data communication, camera operation and recording operation. The processing component 602 may include one or more processors 620 for executing instructions to complete all or part of operations of the above-described method. Besides, the processing component 602 may include one or more modules to facilitate interactions between the processing component 602 and other components. For example, the processing component 602 may include a multimedia module to facilitate the interaction between the multimedia component 608 and the processing component 602.

The memory 604 is configured to store different types of data to support the operations of the electronic device 600. Examples of such data include instructions of any application program or method operable on the electronic device 600, contact data, telephone directory data, messages, pictures, videos, and the like. The memory 604 may be implemented by any type of volatile or non-volatile storage device or a combination thereof, such as a Static Random Access Memory (SRAM), an Electrically Erasable Programmable Read-Only Memory (EEPROM), an Electrically Programmable Read-Only-Memory (EPROM), a Programmable Read-Only-Memory (PROM), a Read-Only Memory (ROM), a magnetic memory, a flash memory, a magnetic disk or an optical disk.

The power supply component 606 provides power for different components of the electronic device 600. The power supply component 606 may include a power management system, one or more power sources, and other components associated with generating, managing and distributing power for the electronic device 600.

The multimedia component 608 may include a screen for providing an output interface between the device 600 and a user. In some examples, the screen may include a Liquid Crystal Display (LCD) and/or a Touch Panel (TP). If the screen includes a touch panel, the screen may be implemented as a touch screen to receive input information from a user. The touch panel may include one or more touch sensors to sense touch, slide and gestures on the touch panel. The touch sensor may not only sense the boundary of a touch or slide motion but also detect duration and pressure related to the touch or slide operation. In some examples, the multimedia component 608 includes a front-facing camera and/or a rear camera. When the electronic device 600 is in an operating mode, such as a shooting mode or a video mode, the front-facing camera and/or the rear camera may receive external multimedia data. Each of the front-facing camera and the rear camera may be a fixed optical lens system or be capable of focal length and optical zoom.

The audio component 610 is configured to output and/or input an audio signal. For example, the audio component 610 may include a microphone (MIC). When the electronic device 600 is in an operating mode, such as a call mode, a recording mode and a speech recognition mode, the microphone is configured to receive an external audio signal. The received audio signal may be further stored in the memory 604 or transmitted via the communication component 616. In some examples, the audio component 610 may also include a speaker for outputting an audio signal.

The I/O interface 612 provides an interface between the processing component 602 and a peripheral interface module. The peripheral interface module may be a keyboard, a click wheel, a button and the like. Such buttons may include but not limited to: a home button, a volume button, a start button and a lock button.

The sensor component 614 may include one or more sensors for providing state assessments in different aspects for the device 600. For example, the sensor component 614 may detect the on/off state of the electronic device 600, and relative locations of components, such as a display and a small keyboard of the electronic device 600. The sensor component 614 may also detect a position change of the electronic device 600 or a component of the device electronic 600, the presence or absence of contact of a user with the electronic device 600, an orientation or acceleration/deceleration of the electronic device 600 and a temperature change of the electronic device 600. The sensor component 614 may include a proximity sensor configured to detect a nearby object without any physical contact. The sensor component 614 may also include an optical sensor, such as a CMOS or CCD image sensor for being used in imaging application. In some examples, the sensor component 614 may also include an acceleration sensor, a gyroscope sensor, a magnetic sensor, a pressure sensor, or a temperature sensor.

The communication component 616 is configured to facilitate wired or wireless communication between the electronic device 600 and other devices. The electronic device 600 may access a wireless network based on a communication standard, such as WIFI, 2G or 3G, or a combination thereof. In an example, the communication component 616 receives a broadcast signal or broadcast related information from an external broadcast management system via a broadcast channel. In an example, the communication component 616 may also include a Near Field Communication (NFC) module to facilitate short-range communications. For example, the NFC module may be implemented based on Radio Frequency Identification (RFID) technology, Infrared Data Association (IrDA) technology, Ultra-Wide Band (UWB) technology, Bluetooth (BT) technology and other technology.

In an example, the electronic device 600 may be implemented by one or more of an Application Specific Integrated Circuit (ASIC), a Digital Signal Processor (DSP), a Digital Signal Processor (DSPD), a Programmable Logic Device (PLD), a Field Programmable Gate Array (FPGA), a controller, a microcontroller, a microprocessor or other electronic components to perform the above method.

In an example, a non-transitory machine readable storage medium storing machine executable instructions is provided, such as the memory 604 storing instructions. The instructions may cause the processor 620 in the electronic device 600 to perform the above method. For example, the non-transitory machine readable storage medium includes ROM, RAM, CD-ROM, tape, floppy, optical data storage devices and so on.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

After considering the description and practicing the present disclosure, those skilled in the prior art may easily conceive of other implementations of the present disclosure. The present disclosure is intended to encompass any variations, uses and adaptive changes of the present disclosure. These variations, uses and adaptive changes follow the general principle of the present disclosure and include common knowledge or conventional technical means in the prior art not disclosed in the present disclosure.

It shall be appreciated that the present disclosure is not limited to the precise structures described above and shown in the accompanying drawings and may be modified or changed without departing from the scope of the present disclosure.

The foregoing descriptions are merely part of examples of the present disclosure and not intended to limit the present disclosure. Any modifications, equivalent substitutions, adaptations made within the scope of the present disclosure shall be encompassed in the scope of protection the present disclosure.

What is claimed is:

1. A method for unlocking an electronic device with fingerprints, comprising:
   detecting a first contact parameter between an object and a touch screen of the electronic device;
   in response to determining that the first contact parameter meets a first preset condition to awaken a fingerprint recognition function of the electronic device,
   detecting a second contact parameter between the object and the touch screen; and
   simultaneously awakening the fingerprint recognition function;
   in response to determining that the second contact parameter meets a second preset condition to perform the fingerprint recognition function, collecting fingerprint information of the object with a fingerprint sensor configured in the touch screen; and
   in response to determining that the fingerprint information matches pre-stored reference fingerprint information, unlocking the electronic device.

2. The method of claim 1, wherein:
   the first contact parameter comprises at least one pressure value applied by the object on the touch screen;
   the first preset condition comprises that a maximum pressure value of the at least one pressure value is greater than a preset threshold;
   the second contact parameter comprises a contact position of the object with the touch screen; and
   the second preset condition comprises that the contact position is located in a fingerprint sensing region on the touch screen.

3. The method of claim 2, wherein detecting the second contact parameter and simultaneously awakening the fingerprint recognition function comprises:
   awakening a touch sensor configured in the touch screen and the fingerprint recognition function;
   wherein the touch sensor is to detect the contact position of the object with the touch screen after being awakened.

4. The method of claim 3, wherein before detecting the first contact parameter, the method further comprises:
   controlling a pressure sensor configured in the electronic device to enter an operating state when detecting that the touch screen is in a screen-off state, so as to detect the at least one pressure value applied by the object on the touch screen.

5. The method of claim 4, wherein awakening the touch sensor and the fingerprint recognition function comprises:
   sending, by the pressure sensor, a first interrupt signal for awakening the touch sensor to the touch sensor; and
   sending, by the pressure sensor, a second interrupt signal for awakening the fingerprint sensor to the fingerprint sensor.

6. The method of claim 1, wherein:
   the first contact parameter comprises a contact position of the object with the touch screen;
   the first preset condition comprises that the contact position is located in a fingerprint sensing region on the touch screen;
   the second contact parameter comprises at least one pressure value applied by the object on the touch screen; and
   the second preset condition comprises that a maximum pressure value of the at least one pressure value is greater than a preset threshold.

7. The method of claim 6, wherein detecting the second contact parameter and simultaneously awakening the fingerprint recognition function comprises:
   awakening a pressure sensor configured in the electronic device and the fingerprint recognition function;
   wherein the pressure sensor is to detect the at least one pressure value applied by the object on the touch screen after being awakened.

8. The method of claim 7, wherein before detecting the first contact parameter, the method further comprises:
   controlling a touch sensor configured in the touch screen to enter an operating state when detecting that the touch screen is in a screen-off state, so as to detect the contact position of the object with the touch screen.

9. The method of claim 8, wherein awakening the pressure sensor and the fingerprint recognition function comprises:
   sending, by the touch sensor, a first interrupt signal for awakening the pressure sensor to the pressure sensor;
   sending, by the touch sensor, a second interrupt signal for awakening the fingerprint sensor to the fingerprint sensor.

10. An electronic device, comprising:
    a processor; and
    a storage medium storing machine executable instructions;
    wherein, upon loading of the machine executable instructions, the processor is caused to execute:
    detecting a first contact parameter between an object and a touch screen of the electronic device;
    in response to determining that the first contact parameter meets a first preset condition to awaken a fingerprint recognition function of the electronic device, detecting a second contact parameter between the object and the touch screen; and
    simultaneously awakening the fingerprint recognition function;
    in response to determining that the second contact parameter meets a second preset condition to perform the fingerprint recognition function, collecting fingerprint information of the object with a fingerprint sensor configured in the touch screen; and
    in response to determining that the fingerprint information matches pre-stored reference fingerprint information, unlocking the electronic device.

11. The device of claim 10, wherein:
    the first contact parameter comprises at least one pressure value applied by the object on the touch screen;
    the first preset condition comprises that a maximum pressure value of the at least one pressure value is greater than a preset threshold;
    the second contact parameter comprises a contact position of the object with the touch screen; and
    the second preset condition comprises that the contact position is located in a fingerprint sensing region on the touch screen.

12. The device of claim 11, wherein the processor is caused to detect the second contact parameter and simultaneously awaken the fingerprint recognition function by:
    awakening a touch sensor configured in the touch screen and the fingerprint recognition function;
    wherein the touch sensor is to detect the contact position of the object with the touch screen after being awakened.

13. The device of claim 12, wherein before detecting the first contact parameter, the processor is further caused to:
control a pressure sensor configured in the electronic device to enter an operating state when detecting that the touch screen is in a screen-off state, so as to detect the at least one pressure value applied by the object on the touch screen.

14. The device of claim 10, wherein:
the first contact parameter comprises a contact position of the object with the touch screen;
the first preset condition comprises that the contact position is located in a fingerprint sensing region on the touch screen;
the second contact parameter comprises at least one pressure value applied by the object on the touch screen; and
the second preset condition comprises that a maximum pressure value of the at least one pressure value is greater than a preset threshold.

15. The device of claim 14, wherein the processor is caused to detect the second contact parameter and simultaneously awaken the fingerprint recognition function by:
awakening a pressure sensor configured in the electronic device and the fingerprint recognition function; wherein the pressure sensor is to detect the at least one pressure value applied by the object on the touch screen after being awakened.

16. The device of claim 15, wherein before detecting the first contact parameter, the processor is caused to:
control a touch sensor configured in the touch screen to enter an operating state when detecting that the touch screen is in a screen-off state, so as to detect the contact position of the object with the touch screen.

17. A non-transitory machine readable storage medium storing machine executable instructions, the machine executable instructions cause a processor to execute acts comprising:
detecting a first contact parameter between an object and a touch screen of an electronic device;
in response to determining that the first contact parameter meets a first preset condition to awaken a fingerprint recognition function of the electronic device, detecting a second contact parameter between the object and the touch screen; and
simultaneously awakening the fingerprint recognition function;
in response to determining that the second contact parameter meets a second preset condition to perform the fingerprint recognition function, collecting fingerprint information of the object with a fingerprint sensor configured in the touch screen; and
in response to determining that the fingerprint information matches pre-stored reference fingerprint information, unlocking the electronic device.

18. The non-transitory machine readable storage medium of claim 17, wherein:
the first contact parameter comprises at least one pressure value applied by the object on the touch screen;
the first preset condition comprises that a maximum pressure value of the at least one pressure value is greater than a preset threshold;
the second contact parameter comprises a contact position of the object with the touch screen; and
the second preset condition comprises that the contact position is located in a fingerprint sensing region on the touch screen.

19. The non-transitory machine readable storage medium of claim 18, wherein detecting the second contact parameter and simultaneously awakening the fingerprint recognition function comprises:
awakening a touch sensor configured in the touch screen and the fingerprint recognition function;
wherein the touch sensor is to detect the contact position of the object with the touch screen after being awakened.

20. The non-transitory machine readable storage medium of claim 17, wherein:
the first contact parameter comprises a contact position of the object with the touch screen;
the first preset condition comprises that the contact position is located in a fingerprint sensing region on the touch screen;
the second contact parameter comprises at least one pressure value applied by the object on the touch screen; and
the second preset condition comprises that a maximum pressure value of the at least one pressure value is greater than a preset threshold.

* * * * *